Feb. 7, 1967  W. C. BEACH  3,302,371
CRUPPER FOR HARNESS
Filed March 10, 1966
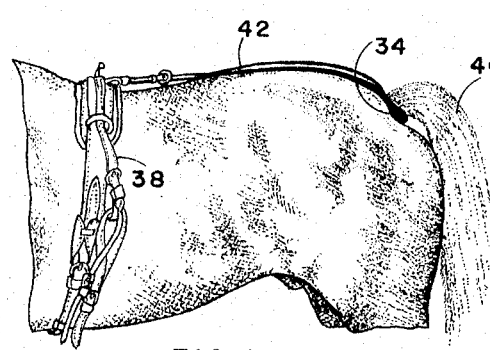
FIG. 1
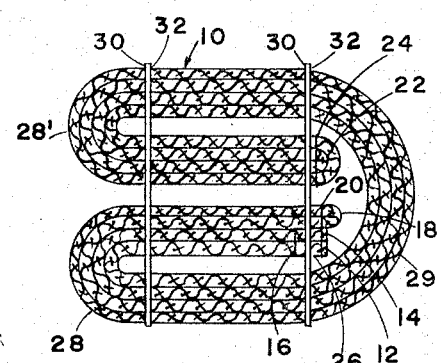
FIG. 5
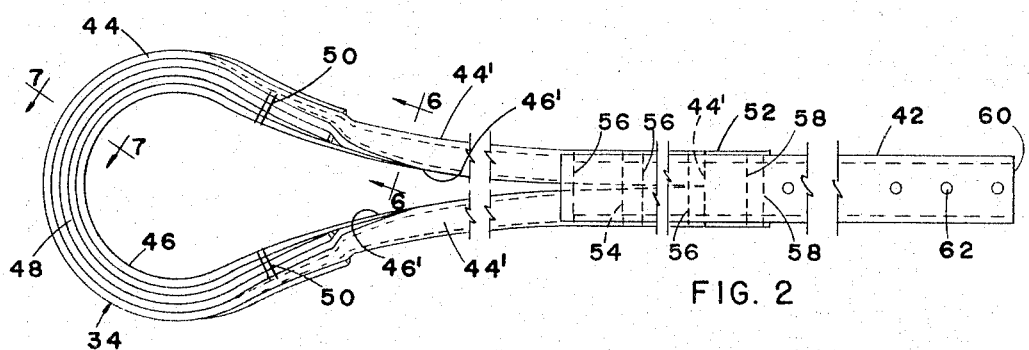
FIG. 2
FIG. 4
FIG. 3
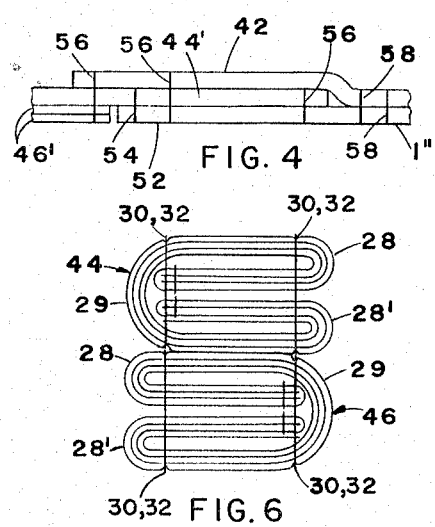
FIG. 6
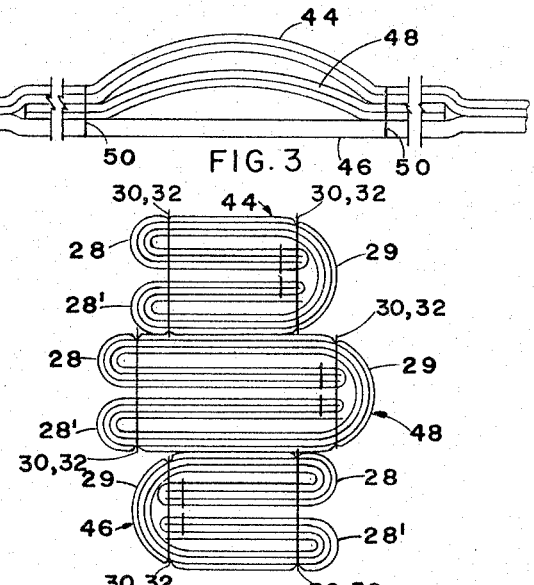
FIG. 7
FIG. 8
INVENTOR
WILLARD C. BEACH
BY
ATTORNEY

United States Patent Office 3,302,371
Patented Feb. 7, 1967

3,302,371
CRUPPER FOR HARNESS
Willard C. Beach, R.D. 1, Glen Rock, Pa. 17327
Filed Mar. 10, 1966, Ser. No. 533,293
6 Claims. (Cl. 54—22)

This invention pertains to a crupper for a set of harness and, more particularly, to a crupper for a set of racing harness possessing maximum strength with minimum weight.

As is well known by horsemen, a crupper is a U-shaped element which is disposed around the upper end of a horse's tail where it joins the spine of the horse. It is necessary in certain types of harness and especially racing harness for trotting races to prevent the saddle and girth of the harness, as well as other parts of the harness connected thereto, from moving forwardly on the body of the horse during normal movements and especially while the horse is running. Hence, the upper end of a horse's tail provides useful means on the body of the horse to which one end of strap means may be connected so as to extend forwardly from the tail of the horse to the saddle member for connection of the forward end of such strap means thereto.

Cruppers used heretofore have conventionally comprised a leather sheath stuffed with suitable material to render the same susbtantially circular in cross-section, while the sheath is arranged in a U-shaped configuration. The edges of the leather sheath which form the exterior surface of the crupper are stitched so as to comprise a narrow, outwardly extending flange-like arrangement offering minimum obstruction. In use, particularly when racing, cruppers as well as substantially all other parts of a set of harness become saturated with perspiration. As a result, unless harness is maintained carefully with suitable water-proofing preparations such as oils, greases and the like, such perspiration tends to render the harness stiff and susceptible to cracking and breaking of the leather. Under such circumstances, situations have occurred where when a horse stumbles or falls while running, the crupper has broken which throws all of the harness forwardly on the horse and results in substantial difficulties of many types.

From the foregoing, it will be seen that a crupper, particularly in a set of racing harness, is an important element for insuring that the saddle and other parts of a set of harness connected thereto remain in operative position under all conditions of use. It also is necessary that a crupper be relatively strong so as to maintain particularly the saddle of a set of harness in operative position and prevent forward movement thereof which might result from either normal or accidental movements of the horse upon which the harness is mounted.

It is the principal object of the present invention to provide a crupper which preferably is formed from a plurality of elongated composite strips arranged in nested and laminated relationship, and formed into a U-shaped configuration in plan view for disposition around the upper end of a horse's tail, said composite strips being formed individually from a band of predetermined width of textile fabric woven from synthetic resin filaments which are inherently substantially waterproof, said strips being folded a plurality of times upon themselves to form a composite strip of a plurality of plies, which plies are secured permanently together by rows of stitches adjacent the opposite edges of the composite strips, whereby no stuffing is required and maximum strength with minimum weight is afforded.

It is another object of the invention to utilize composite strips of different widths and arrange the same in superimposed relationship so that the outermost strips of the U-shaped configuration are narrower than any other strip disposed therebetween, whereby the cross-sectional configuration of the assembly of strips is at least partially substantially circular and thereby effectively provides a crupper which will be comfortable in use by a horse.

A further object of the invention is to provide a crupper in which said plurality of strips are connected together at the end portions thereof, while the intermediate portions are free to move apart transversely as when the crupper is stretched toward a straight configuration from the U-shaped configuration thereof, thereby facilitating ready drying of the crupper and effecting any cleaning thereof which might be necessary.

Still another object of the invention is to utilize composite strips of folded synthetic resin textile fabric which each have sufficient plies therein, in proportion to the width thereof, that the thickness of said strips is at least one-fourth the width of said strips, whereby a very limited number of said strips may be arranged in superimposed relationship in order to effect a laminated type of crupper solidly formed from said strips and the composite arrangement being generally nearly as thick as it is wide and thereby having an effective shape corresponding favorably to that of a conventional stuffed leather crupper.

A still further object of the invention is to form the outermost, narrowest strips of said assembly of composite strips with longer end portions than any intermediate strip disposed therebetween, thereby reducing the thickness of said ends of the composite crupper for attachment of said ends to means by which connection of the crupper to a set of harness is effected.

Details of the foregoing objects and details of the invention, as well as other objects thereof, are set forth in the following specification and illustrated in the accompanying drawing comprising a part thereof.

In the drawing:

FIG. 1 is a fragmentary illustration of the hind quarter of an exemplary side elevation of a horse and showing a racing type saddle and girth, as well as a crupper and crupper strap mounted thereon, the crupper embodying principles of the present invention.

FIG. 2 is a top plan view of the crupper embodying the principles of the present invention, the same having a crupper strap extending from the right-hand end thereof, said strap being fore-shortened to accommodate it to the sheet of drawing.

FIG. 3 is a fragmentary view showing the normally U-shaped crupper stretched partially toward straight condition and illustrating separation of the plurality of strips comprising the same.

FIG. 4 is a fragmentary side elevation of the connecting means by which the crupper is connected to the crupper strap for attachment to the saddle of a set of harness.

FIG. 5 is an enlarged, cross-sectional view of a typical composite strip employed in the crupper and its attaching means embodying the principles of the present invention, said illustration being exaggerated from its true proportions and closely positioned plies in order to provide illustration of the manner in which the fabric from which the strips are formed is folded into preferred configuration.

FIG. 6 is a cross-sectional view of the attaching end members of the crupper as seen on the line 6—6 of FIG. 2, the various plies of the fabric from which the strips are folded being illustrated by a single exemplary line and the folded arrangement being exaggerated for the same purpose as employed in FIG. 5.

FIG. 7 is an exemplary cross-sectional view of the bight portion of the crupper as seen on the line 7—7 of FIG. 2, the same type of exaggerated illustration being employed in said figure as in FIG. 6 for purposes of illustrating the folded arrangement of the fabric to form the various composite strips.

FIG. 8 is an exemplary cross-sectional view of the bight portion of the crupper approximately in proportion to a typical assembly of composite strips, the same being enclosed within an exemplary circle to illustrate the general and at least partially circular cross-sectional configuration of the portion of the crupper which is in engagement with the upper end of a horse's tail.

The present invention essentially comprises an adjunct to the set of harness comprising the subject matter of co-pending application, Serial No. 363,118, filed April 28, 1964, in the name of the same inventor as the instant application. The set of harness in said aforementioned application includes a crupper for purposes of rendering the set of harness described in said application complete. Said crupper illustrated therein does not embody the principles of the present invention. The crupper forming the subject matter hereof has certain principles embodied therein which form the subject matter of the prior application but such principles are adapted specifically to a crupper as described and claimed hereinafter.

As in the set of harness of said prior application, the present invention departs from conventional material and structure normally employed in harness and, especially, racing harness for trotting races, wherein leather is the conventional material. For reasons described in detail in said prior application, harness made from textile fabric woven from synthetic resin fibers or filaments, of which several exemplary types are sold under the trade names "nylon," "Dacron" and the like, and of which bands of predetermined width thereof are folded into multi-ply condition and stitched longitudinally to form composite strap-like strips, when considered length for length relative to conventional leather harness, possess vastly superior strength thereover. An entire set of harness, when made in accordance with said invention, possesses less than one-fourth the weight of a conventional set of racing harness, for example. The purpose of the present invention, therefore, primarily is to provide a crupper possessing superior strength and minimum weight for use with harness of the type comprising the subject of said co-pending application.

A conventional crupper comprising a stuffed leather sheath is approximately circular in cross-section and its largest portion has a diameter of approximately ¾ of an inch. A crupper of this cross-sectional shape and size is desirable, primarily to afford comfort to a horse and not tend to cut into the hide of the horse where engaged by the crupper. Accordingly, in order to provide a similar shape in the crupper comprising the present invention, a series of laminated composite strips 10 having a plurality of parallel, closely overlying, laminated plies are formed from a band of substantially uniform width of textile fabric woven from synthetic resin filaments or fibers of the type referred to above, such as "nylon," "Dacron," or the like. Said bands are folded upon themselves a number of times to produce a strip having a thickness such that, when a limited number of such composite strips are placed in nested, laminated relationship and formed into a U-shaped configuration, the assembly will be substantially circular in cross-section, as can be seen by reference to diagramatic FIG. 8 of the drawing.

By referring to FIG. 5, a typical, preferred folded configuration of a band of textile fabric is shown in enlarged and exaggerated, slightly exploded manner, certain parts thereof being spaced apart so as better to delineate, for illustration purposes, the individual folds and laminations of the composite strip 10 shown in said figure. For purposes of illustrating the strength of an exemplary composite strip of this type, a four inch wide band of desired synthetic resin textile fabric such as "nylon," when folded into a composite strip having eight plies and an overall width of ½ inch, will sustain a tensile load of approximately 4,000 pounds.

By way of comparison with conventional harness leather, a strip of best grade cowhide harness leather, ½ inch in width, would have to be at least five times thicker than the laminated fabric type strip embodying the present invention referred to above in order to sustain a comparable tensile stress. Obviously, a set of harness made from leather of such dimension would be prohibitively heavy. For example, a set of conventional racing harness for trotting horses made from conventional leather and even of a so-called light-weight design has a minimum weight of approximately 18 pounds and generally is slightly more than that. In comparison, a complete set or harness embodying the principles of said co-pending application totally weighs approximately 4 pounds, yet has substantially greater strength than the so-called light-weight leather racing harness of the type referred to.

Particularly for purposes of providing substantial thickness for the strips 10 which are folded from bands of synthetic resin textile fabric, in accordance with the principles of the present invention, and referring to the exaggerated, somewhat exploded illustration in FIG. 5, it will be seen that said band is folded upon itself to dispose the side edges 12 and 14 in even alignment with each other and a row of stitching 16 connects said edges together. The fold 18 originally opposite the side edges 12 and 14 also preferably is provided with a row of stitching 20 to stabilize the same. Said folded configuration then is folded upon itself to place the fold 18 and stitched edges 12 and 14 adjacent each other and thereby form an opposite composite fold 22 which is stabilized by a row of stitching 24. The overlapping fold 18 and edges 12 and 14 of the fabric similarly are connected by an additional row of stitches 26.

Preferably for purposes of disposing the original side edges 12 and 14 of the band of fabric innermost and therefore secured for greatest effect against possible raveling, the folded arrangement thus far formed, which comprises four plies of the original fabric at this stage, is further folded by turning both outermost edges thereof inwardly toward each other until they meet substantially along the median line of the aforementioned 4-ply intermediate product. This results in an 8-ply intermediate product, the opposite edges of which comprise folds 28 and 28'. A final folding operation comprises folding the last-formed 8-ply intermediate product along the median line thereof, thereby forming a final fold 29. This 16-ply arrangement is stabilized preferably by two symbolically illustrated exemplary double rows of stitches 30 and 32, which may either be immediately adjacent each other or overlie each other. In regard to all of the aforementioned stitching, the thread preferably used is of the same composition as that from which the bands of textile fabric are formed, but of larger gage, so as to be readily durable, strong, long lasting, and substantially waterproof.

By way of specific example, but without limitation thereto, assume that a strip of 16-ply material of the type referred to is desired in a final product which is to be ½ inch wide. The initial band from which this product is formed is approximately 8 inches wide. After all of the folding described immediately above has been completed, the final rows of stitches 30 and 32 preferably are disposed respectively adjacent the opposite edges of the composite strip but spaced inwardly therefrom approximately ⅛ of an inch, for example, and parallel to said outer edges. The thickness of such 16-ply product is approximately ⅛ inch.

By way of a further example, if a 16-ply laminated strip of approximately ¾ inch width is desired, a band of textile fabric of the aforementioned type approximately 12 inches wide is selected for the folding operations described hereinabove. The final, double rows of securing stitches 30 and 32 adjacent opposite edges thereof similarly are spaced approximately ⅛ inch inwardly from the opposite outer edges of the composite strip and the overall thickness, as described above with respect to the ½ inch composite strip, is approximately ⅛ inch. When forming composite strips of different widths from those described above, it is only necessary to select a band of original material substantially 16 times as wide as the desired width of the final 16-ply product. However, it has been found that, for practical purposes, strips wider than ¾ of an inch preferably should have at least one additional row of stitches arranged longitudinally along the median line of the composite strip to render the same stable, reasonably flat, and also to impart desired limited stiffness to the laminated strip product. Such desired degree of stiffness is imparted to products of ½ inch and ¾ inch widths, for example, by the double rows of stitches 30 and 32 respectively applied adjacent the opposite edges of the strips. This degree of stiffness, for example, approximates that of leather of comparable width and thickness.

For purposes of adapting laminated strips of the type described above to the structure of a crupper, attention is next directed to FIG. 2 in which an exemplary crupper 34 is illustrated which embodies the principles of the invention. The working position of such crupper in relation to a horse 36 and the saddle 38 of an exemplary set of racing harness for trotting horses is illustrated in FIG. 1. It will be seen that the crupper 34 is positioned around the upper end of the horse's tail 40 and a crupper strap 42 extends between the crupper 34 and the saddle 38 so as to connect the crupper with the harness assembly in order that the crupper will function to accurately position the saddle, for example, and restrain it against forward movement from its desired, operative position during all motions of the horse.

In accordance with the preferred construction of the crupper comprising the present invention, it preferably consists of a pair of elongated composite strips 44 and 46 which, for example, are both of 16-ply construction and approximately ½ inch wide and substantially ⅛ inch thick. These comprise the outermost strips of an exemplary, composite 3-strip assembly constituting the illustrated example of crupper 34. Sandwiched between the outermost strips 44 and 46 is an intermediate composite strip 48 which, as is best seen from FIGS. 8 and 9, is wider than the outermost strips 44 and 46. For example, the intermediate strip 48 perferably is approximately ¾ inch wide and ⅛ inch thick. It, also, is preferably of 16-ply construction. In such an arrangement, the thickness of the assembly is at least more than one-half the width thereof and as seen in FIG. 8, the assembly, through laminated, has an overall, generally circular cross-section.

The intermediate strip 48 is substantially shorter than the outermost strips 44 and 46, as is clearly apparent from FIGS. 2 and 3, and the 3-strip laminated assembly is curved around a suitable form of desired diameter to produce the U-shaped configuration best shown in FIG. 2. The ends of the laminated 3-strip configuration, when so shaped, are clamped to maintain the relative positions of the ends of the intermediate strip 48 with respect to the overlying outermost strips 44 and 46. While so clamped, a suitable number of short rows of cross-stitches 50 are applied to the end portions of such assembly to secure especially the ends of the intermediate strip 48 in desired fixed relationship with respect to the overlying outermost strips 44 and 46. From Fig 2, it will be seen that the outermost strips 44 and 46 have elongated attaching ends 44' and 46' which extend appreciable distances beyond the ends of the intermediate strip 48 for attachment to connecting means 52 by which the crupper is attached to the crupper strap 42, details of which are as follows:

Referring to FIGS. 2 and 4, the attaching means 52 preferably comprises a laminated strip of 16-ply material, for example, made in accordance with the method described above relative to laminated strips 44, 46 and 48 but preferably, for example, strip 52 is 1 inch wide in view of the fact that the outermost composite strips 44 and 46 are each ½ inch wide, whereby when the ends 44' and 46' thereof are brought into suitably twisted relationship with respect to the bight portion of the curved crupper 34, so as to dispose them flatly, within a common plane, and in edge contacting relationship, such juxtapositioned ends will be equal in width to the composite connecting strip 52.

Referring to FIG. 4, it will be seen that the attaching ends 46' of the outer composite strip 44 are disposed beneath the attaching ends 44' of the other composite strip 44, the terminal extremities of end portions 44' extending beyond the terminal extremities of the end portions 46' preferably several inches in actual production. This measurement is not to be regarded as restrictive however. Said extending terminal extremity of the ends 44' overlie the upper surface of connecting strip 52 as is clear from FIG. 4 and a short transverse row of stitching 54 connect the same together. The upper surface of the terminal portion of each of the end portions 44' is covered by the terminal end portion of crupper strap 42 and two rows of longitudinally spaced, transversely extending stitches 56 extend through the laminated arrangement as illustrated in FIG. 4. One further short transverse row 58 of stitches also extends through the overlying portions of connecting means 52 and crupper strap 42 as also shown in FIG. 4.

The connecting arrangement described immediately above affords a mechanically effective and aesthetically pleasing arrangement especially for purposes of reducing the 1 inch combined width of the adjacent connecting portions 44' and 46' to the narrower ¾ inch width of the crupper strap 42. The free end of the crupper strap 42 preferably is cut suitably to form a square or any other desired configuration of end surface 60. In view of the fact that the synthetic resin from which the textile fabric comprising the various strips of the crupper strap and its attached strap-like members are formed preferably is thermoplastic, the severed end surface 60 may be stabilized by application of heat which slightly melts all of the exposed severed ends of the resin filament and fuses them into a substantially solid surface mass, thereby preventing any raveling of said ends.

Similarly, the outer end portion of the crupper strap 42 preferably is provided with a series of spaced holes 62 which, also, because of the fact that the synthetic resin material preferably is thermoplastic, permits the holes 62 to be formed by inserting a heated, pointed tool therethrough, of the nature of an awl or ice pick. Such tool forms said holes partly by deforming and re-arranging the filaments of the weave through the insertion of the pointed tool therethrough and otherwise by fusing the filaments, whereby the outline of the hole 62 is permanently stabilized due to such fusing or melting of the synthetic resin material which comprise the walls of said holes. The holes are for purposes of connecting the free end of the strap to an appropriate buckle connected to the saddle 38 for example.

It can be visualized from FIG. 2 that the length of outer strip 44 is longer than intermediate strip 48 between the connecting rows of stitches 50. Similarly, inner strip 46 is still shorter than strip 48 between stitches 50. Hence, when the assembly of strips 44, 46 and 48 is stretched toward straight condition, the strips will be spaced transversely apart, as shown in exemplary manner in FIG. 3. This facilitates drying and cleaning the crupper, when necessary.

From the foregoing, it will be seen that the present invention provides a crupper and an attaching crupper strap fixed thereto which is highly durable and capable of sustaining tensile stresses substantially greater than those which can be sustained by conventional leather-type cruppers and crupper straps of similar dimensions. The crupper assembly comprising the invention also is substantially water-proof and free from possibilities of mildew and mold occurring from moisture to which the assembly may be subjected, regardless of whether it is from weather sources, perspiration, or otherwise. Further, the thicker, U-shaped portion of the crupper which immediately engages the upper end of the horse's tail is capable of having the laminated strips comprising the same spaced apart for quick drying and also to facilitate cleaning the same merely by stretching said curved portion toward a straight configuration.

Concerning the exemplary illustrations of cross-sectional folded configurations such as shown in FIGS. 5–7, it is to be understood that the arrangements shown therein preferably are only exemplary and not restrictive, the same representing possible arrangements of the folded configuration of the laminated strips in relationship to each other, whereby, for example, the final folded edge 29 of said assembled composite strips will not be all on the same side of the assembled elements.

While the invention has been described and illustrated in its several preferred embodiments, it should be understood that the invention is not to be limited to the precise details herein illustrated and described since the same may be carried out in other ways falling within the scope of the invention as claimed.

I claim:

1. A crupper for a set of harness comprising in combination, a plurality of elongated composite strips arranged in nested laminated relationship and in a substantially U-shaped configuration in plan view for disposition around the upper end of a horse's tail, and means connecting together the end portions of said strips into a crupper assembly; said strips each being formed from a band of predetermined width of textile fabric woven from synthetic resin filaments and folded a plurality of times upon itself to form a composite strip of at least four plies of substantially even width, said plies being secured permanently together by rows of stitches adjacent the opposite edges of said composite strips, the outermost composite strips of said assembly thereof being narrower than any other strip therebetween, whereby the cross-sectional shape of said assembly is at least partially substantially circular to provide comfort to a horse.

2. The crupper according ot claim 1 in which the composite strips of said U-shaped assembly progressively are longer from the innermost to the outermost strip, whereby when said assembled strips are stretched toward straight configuration the intermediate portions between the ends of said strips will be spaced apart.

3. The crupper according to claim 1 in which the thickness of said assembled strips in the bight of said U-shaped configuration thereof is at least over half the width thereof.

4. The crupper according to claim 1 in which there is an intermediate composite strip and two outer composite strips in juxtaposition to the opposite surfaces of the intermediate strip, said outer strips being of equal width and narrower than the intermediate strip.

5. The crupper according to claim 4 in which the ends of said outermost composite strips extend beyond the ends of said intermediate strip, said ends of said outer strips being disposed flatly side-by-side within a common plane, and means connecting said ends to a strap member substantially twice as wide as said ends of said outer strips for connection to other parts of a set of harness.

6. The crupper according to claim 1 in which the strips of fabric from which said composite strips are formed are folded in a manner to dispose the outer edges of the fabric strips on the interior of said assembly, whereby the edges of said composite strips are smoothly rounded.

References Cited by the Examiner

UNITED STATES PATENTS

| | | | |
|---|---|---|---|
| 277,516 | 5/1883 | Shaffer | 54—22 |
| 297,601 | 4/1884 | Hedrick | 54—22 |
| 899,576 | 9/1908 | Varnum | 54—22 |

SAMUEL KOREN, *Primary Examiner.*

HUGH R. CHAMBLEE, *Examiner.*